No. 696,004. Patented Mar. 25, 1902.
G. D. BURTON.
ELECTRIC METAL WORKING APPARATUS.
(Application filed Feb. 23, 1897.)
(Specimens.)
2 Sheets—Sheet 1.
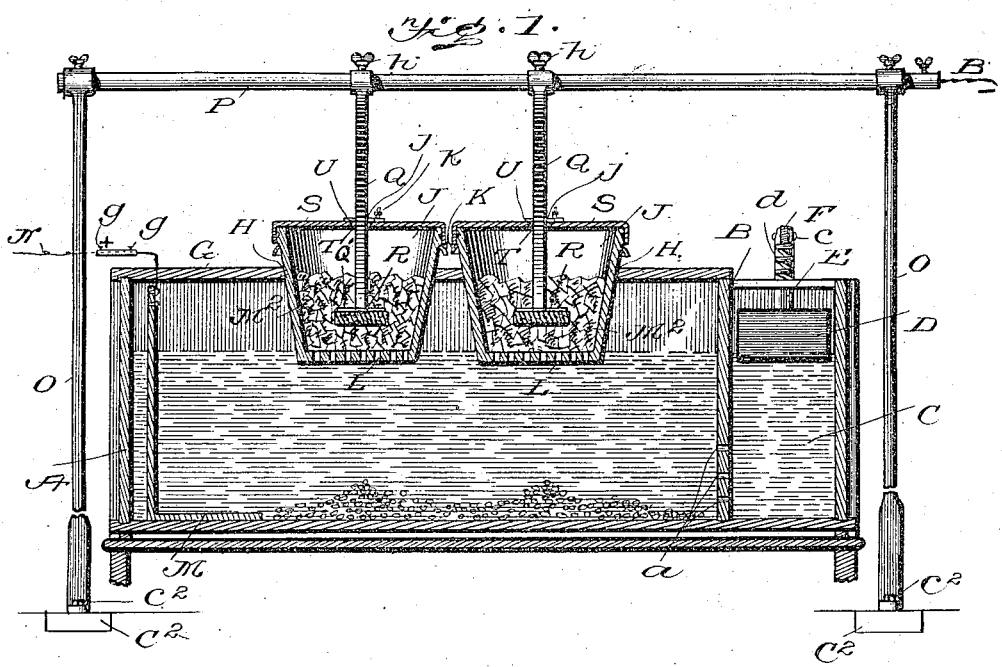
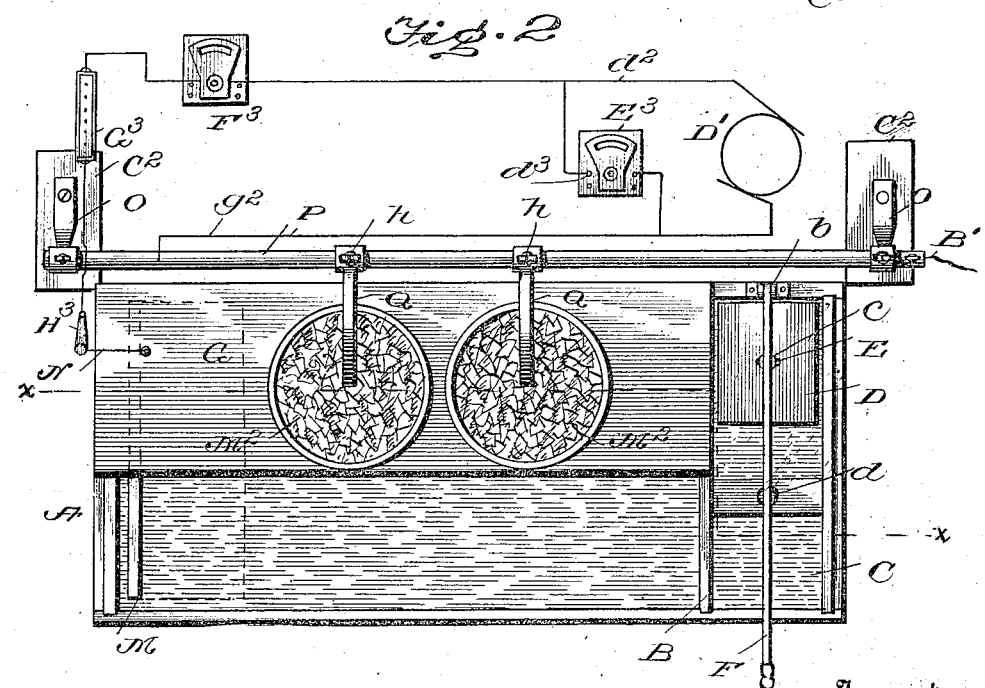
Witnesses
Inventor
George D. Burton
by Chas. E. Barber
Attorney

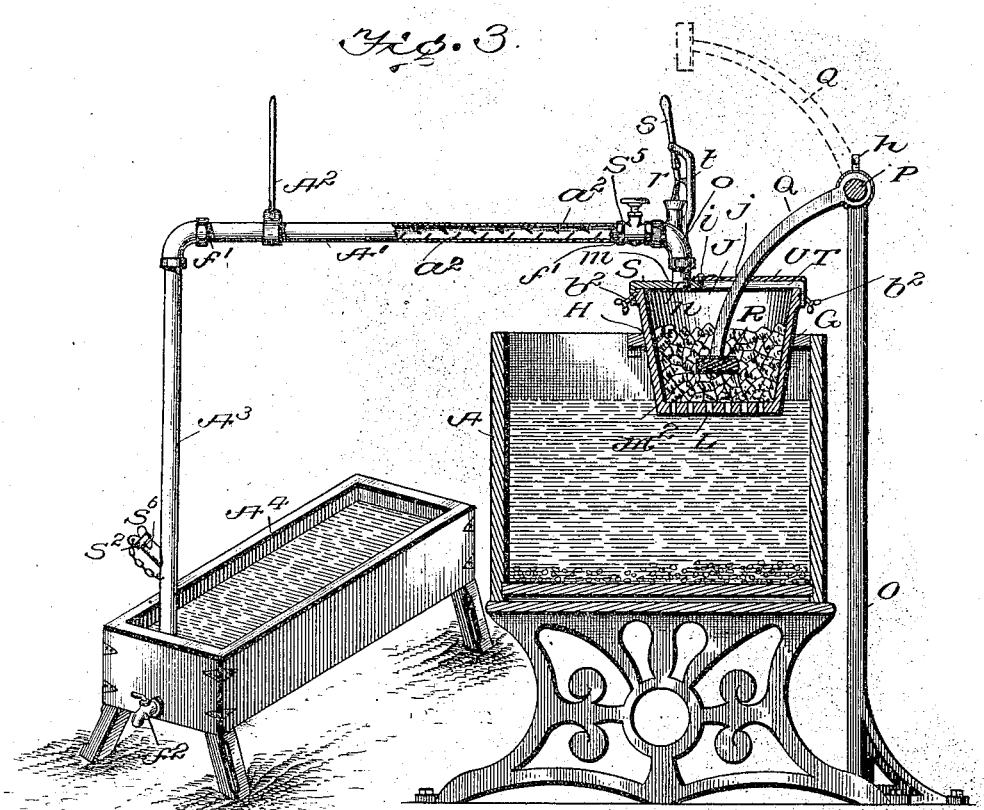

UNITED STATES PATENT OFFICE.

GEORGE D. BURTON, OF BOSTON, MASSACHUSETTS.

ELECTRIC METAL-WORKING APPARATUS.

SPECIFICATION forming part of Letters Patent No. 696,004, dated March 25, 1902.

Application filed February 23, 1897. Serial No. 624,602. (Specimens.)

*To all whom it may concern:*

Be it known that I, GEORGE DEXTER BURTON, a citizen of the United States, residing at Boston, in the county of Suffolk and State of Massachusetts, have invented certain new and useful Improvements in Electric Metal-Working Apparatus, of which the following is so full, clear, and exact a description as will enable others skilled in the art to which my invention appertains to make and use the same, reference being had to the accompanying drawings, in which—

Figure 1 is a section on the line $x\ x$ of Fig. 2. Fig. 2 is a top plan view of my improved apparatus. Fig. 3 is a view, partly in perspective, of the same. Fig. 4 represents a perspective view of the cover for the vessel for holding the substance to be treated. Fig. 5 represents a perspective view of the receptacle for holding the substance to be treated, showing the side and the perforated bottom thereof. Fig. 6 represents a vertical section of the pipe leading from the receptacle for containing the substance to be treated to the condensing-tank and showing a valve thereon and the mechanism for actuating it.

The object of my invention is to provide an apparatus by the use of which metals or any substance containing metal may be successfully heated and treated.

Another object of my invention is to provide an apparatus by the use of which the substance to be treated is placed in a non-conducting receptacle in such a manner that the vapors and gases forced off therefrom may be conducted to a tank or receptacle for the same and there partially separated and condensed and preserved for use.

Another object of my invention is to provide an apparatus by the use of which the vapors and gases which are forced off from the matter to be heated may be conducted through a suitable conduit or conduits provided with suitable deflectors, the result of which will be to cause the solid particles in such gases and vapors to separate and lodge within the conduit, from which they may be removed at will and preserved for future use.

The objects generally of my invention are to provide an apparatus by the use of which the matter to be treated may be heated and treated indefinitely at varying degrees of temperature and always under the control of the operator, and in such a manner that none of the valuable ingredients in the gases and vapors will be wasted and lost and none of them will be destroyed by reason of too much or too little heat, as would result if the amount of heat were not under the control of the operator and could not be increased and decreased at will for the various steps in the process of treatment, as will be hereinafter explained.

In the accompanying drawings, A designates a tank which is filled with solution adapted to cause the forming of the voltaic arc when combined with a suitable source of electrical supply—such as a solution consisting of thirty gallons of water, ten pounds of sal-soda, and two pounds of chlorid of sodium where ores containing nickel, iron, sulfur, arsenic, &c., are to be treated; a solution consisting of thirty gallons of water and ten pounds of chlorid sodium where ores containing lead or silver galena are being treated. The solution in all cases must be varied to conform to the chemical properties of the ores under treatment, which one skilled in the art will readily understand. In one portion of the tank A is a partition B, provided with apertures $a\ a$. The tank A and partition B may be made of well-oiled wood, slate, or any non-conducting material. The partition B divides the main tank so as to form a section, in the upper part of which is a plunger or displacer D, operated by a suitable stem or rod E, which is operated by a lever F, pivotally secured at $b$ and connected pivotally with the stem E at $c$. The stem E is provided with a spring $d$ to cause the lever F to fly back to its normal position when pressure thereon is removed. The tank A is also provided with a slab G, of wood, slate, or other non-conducting material, which is provided with openings H for the reception of the receptacles J J, composed of a composition of fire-clay and railroad-cinders, made under hydraulic pressure and afterward baked, which are in turn provided with handles K K and which are perforated through the bottom, as shown at L L. The opposite side or end of the tank A is provided with a metal plate M, preferably of lead, to which is connected the positive terminal of a suitable source of electricity. The leading-in wire is secured to the sleeve N and provided with suitable binding-screws $g$ $g$. Two uprights O O support a bearing or shaft P, to which are pivotally secured two swinging electrodes Q Q, composed, preferably, of copper or other substance of low resistance, at the free end of which is secured a disk or plate R, preferably of carbon or other suitable conducting material. The disk or plate R should be about four inches across and one inch thick. Plates or disks Q', of any suitable metal, such as copper, may be disposed at the free ends of the electrodes Q Q and the carbon disks R connected thereto. Each of the swinging arms or electrodes Q Q is provided with a set-screw H, by the use of which the electrodes may be fixed securely in position whenever it is desired to keep them thus fixed, or they may be permitted to be loose during the metal-working operation. Each of the receptacles J J is provided with a cover S, having a slotted opening T, which in turn is provided with a sliding cover $u$, which is pivotally secured to the cover at $i$ and which is recessed at $j$ to cause it to partially encircle the electrode Q when it is swung into a closed position. It should also be provided with a set-screw $k$ for locking it in position when desired. The cover $g$ is also provided with a hole $m$ for the reception and accommodation of the pipe-coupling $n$, which in turn is connected to the elbow $o$. The upper portion of the elbow $o$ is provided with a boss or valve-seat $p$, which is adapted to receive the valve $q$, which is held in position by a toggle-joint $p$, operated by a lever $s$, which is supported by and pivotally secured to the standard $t$. By the manipulation of the handle of the swinging lever $s$ the valve may be opened at will or closed in such a manner that it will hold itself in place and cannot be displaced by any pressure from the inside. A pipe A' is connected with the elbow $o$ and is provided with internal projections and deflectors $a^2$ $a^2$, which obstruct and contact with the gases and vapors in their passage through the pipe, causing the solid matter conveyed by such gases and vapors as are forced off during the process of treatment to be deposited in the pipe A'. The pipe A' is supported from above by suitable pipe-support $A^2$. The pipe A' has connected to it a vertical pipe $A^3$, which projects down into a tank A containing a suitable liquid. The tank $A^4$ is lined in some cases with lead or zinc. This tank is made preferably of wood or any non-conducting material, such as porcelain, red fiber, paper, fire-clay, or any other suitable material for this purpose. The lining of the tank $A^4$ should be composed of a material adapted for the purpose which it is intended to subserve. Where it is desired to convert the gases and vapors into sulfuric acid, lead would be preferable. Of course if particles of gold were to be saved and collected in this tank zinc would be wholly inappropriate, and other suitable material should be used for the lining. Other matters will suggest themselves for this purpose, and one skilled in the art would of course have no trouble in determining the proper material for this lining.

The negative connection B' is composed of iron, copper, or other good conductor of electricity and connected by means of a suitable coupling and binding post, as hereinbefore described. The receptacles J J are flaring, outwardly and upwardly from the bottom to cause them to be readily emptied. On the outside of the upper edge of the receptacles J J, I provide a groove $b'$, into which is adapted to project the screws $b^3$ $b^3$ for holding the cover in position on the receptacle. The uprights O O are secured to suitable bed-plates $C^2$ $C^2$ by bolts $c^2$ $c^2$. A dynamo D' is located in close proximity to the apparatus and is shown incidentally in Fig. 2 and is connected by a conductor $d^2$, which leads from the dynamo to the binding-screw $d^3$ to the voltmeter E. An ammeter $F^3$ is located between the resistance-box $G^3$ and the dynamo. The circuit is made or broken in the tank by manipulating the switch $H^3$, as will be readily understood. The dynamo is connected electrically with a bar A' through the medium of the electrical conductor $g^2$. The number of receptacles may be increased or diminished in proportion to the volume and intensity of the current, which of course will be gaged by the character and amount of work to be done. These receptacles may be arranged around a circle or part of a circle or in any other suitable position with respect to the tank without departing from the spirit of my invention. It will of course be understood that I simply illustrate one means of carrying my invention into practice; but I do not wish to be understood as limiting myself to the construction of the details nor the arrangement of the parts shown and described, as they may be varied at will without departing from the spirit of my invention and without in any way interfering with its usefulness.

The substance or material to be treated should be put into the receptacle, as shown at $H^2$ in Figs. 1, 2, and 3. The electrode Q is then swung into position and into contact with the substance to be treated. The cover S is then put in position over the receptacle and secured there by the set-screws $b^2$ $b^2$. The pipe A' is then secured into communication with the interior of the receptacle J and the sliding cover U is swung into the position shown in Fig. 3, and the interior of the receptacle J will then be partially closed. The current is then switched on and the plunger D is depressed in the compartment C of the tank A, forcing the solution in the tank up into contact with the bottom of the receptacle J and through the perforations L L up into the interior and into contact with the substance under treatment in the receptacle. The electric or voltaic arc is then established between the substance near the bottom of the receptacle and the liquid in the receptacle and around the substance contained therein, which creates heat and causes the substance to be freed from moist and vaporous gases, which are conducted off through the pipe A', and such particles as are not obstructed by the deflectors $a^2$ $a^2$ in the pipe are conducted into the tank $A^4$ through the pipe $A^3$. The carbon R on the electrodes Q being capable of withstanding a much higher degree of heat than the substance under treatment does not readily waste away and will last a long time and serve its purpose, while a large quantity of the substance to be treated and converted and separated will be successfully treated, and the process may be repeated a great many times without replacing or substituting the carbon R. In the treatment of some substances a disk composed of copper and antimony would serve equally as well—as, for instance, in the handling of such ores as are known in mining as "silver-galena." The material in the furnace to be treated and separated is fluxed according to its character and the chemical properties of the substances contained therein. In the treatment of ores containing sulfur, antimony, and arsenic I would flux such ore or substance with the proper proportions of chlorid of sodium and sal-ammoniac. When the ores are properly fluxed and all the conditions are favorable, small metallic particles will leave the ore, pass off through the openings L L in the receptacle, thence through the liquid or solution to the bottom of the tank A and be there deposited in small globules, which globules will be in size in proportion to the richness of the ore under treatment. In ores containing gold, silver, and lead each of these will be found in separate globules each of its own kind—that is to say, they are separated by reason of the fact that each melts at a different degree of heat—and as they fall by their own gravity through the liquid in the tank A they become cooled by the liquid before they reach the bottom and solidify to such an extent that when they do reach the bottom they will not run together. Between and about the deflectors $a^2$ will be found deposited particles of flour of sulfur, metallic arsenic, &c., which are carried off in and by the vapors and gases from the ore in the receptacle containing such substances. The lighter fumes, such as zinc and the fumes of lead, and the light fumes of sulfur, such as are so light as not to be affected by the deflectors, are carried farther along and are finally deposited and separated in the liquid in the tank $A^4$, from which they may be removed at will. This arrangement provides an economical and useful apparatus for treating ores and other substances containing metals. A number of receptacles may be operated separately, consecutively, or together. Refractory or rebellious ores containing gold, silver, and copper are successfully treated by this process. In some cases it is necessary to flux the material to be charged with chlorid of sodium and bicarbonate of soda, which causes the metal to be more rapidly reduced from the ore. It is difficult to determine just the required flux necessary to expel the metal from the ore until a chemical analysis has been made of the ore for the purpose of ascertaining the exact nature of the ore, thereby determining the best flux to accomplish a successful treatment. Where I use the word "ore" in this specification, I desire it to be understood as applied to substances in any form which contain metallic particles in an untreated state.

In treating ores containing copper and lead the moisture in the ore will vaporize and then afterward condense and pass off to the tank. The metallic particles of copper and lead in the ore will melt therefrom under the electric arc and pass through the solution to the bottom of the tank. In passing through the solution they will become cool and settle to the bottom of the tank in the form of metallic globules. Some of the slag from the ore will also cool and pass down in this manner.

When it is desired to convert the sulfurous fumes or particles forced off from the ore or substance under treatment directly into sulfuric acid, I place an inwardly-opening valve or plug $S^2$ in the pipe $A^3$ and inject at that point oxygen into the pipe and thence into the solution in the tank $A^4$.

The pipe A' can be made of metal or any non-conducting material, and when it is desired to remove the residue or metallic particles which are deposited in the pipe it is uncoupled at F' F' and the contents poured into a suitable receptacle and the pipe replaced and the operation continued. The tank $A^4$ should be provided with a suitable spigot or outlet-plug $F^3$ for removing the liquid contents of the tank.

It will be readily understood that the addition of a flux to different ores should be done at different times, either before the ore is treated at all or after it has been partially treated. Certain ores should be provided with a flux before they are put into the receptacle in which they are to be treated, and the flux may be added to certain other ores after they have undergone partial treatment, all of which will be readily understood by those skilled in the art. I wish to be understood, therefore, as not limiting myself to any precise time of adding the flux to the ores during the process of treatment.

A valve $S^5$ is provided in the pipe A' to prevent the moist gases expelled from the ore in the early process of treatment from escaping into and through the pipe A', thus preventing the pipe A' from becoming moist or damp, because should the pipe A' become moist the sulfurous fumes, flour of sulfur, metallic arsenic, and the various oxids forced off from the ore under treatment would stick and would not circulate freely through the pipe.

Having described the objects, uses, and advantages of my invention, and having described and shown one means of carrying the same into practice, what I desire to secure by patent, and what I therefore claim, is—

1. The combination of a receptacle for containing a substance to be treated, said receptacle having perforations in the bottom thereof adapted to admit an electrolyte into said receptacle, and to permit the treated substance to pass out therethrough, a cover for said receptacle provided with a slot therein, an electrode adapted to extend through said slot into said receptacle, and means for bringing the electrolyte into contact with the substance being treated.

2. The combination of a receptacle for containing a substance to be treated, said receptacle having perforations in the bottom thereof, a cover for said receptacle provided with a slot therein, an electrode extending through said slot into said receptacle, a recessed sliding cover for said slot adapted to fit closely around said electrode, and means for bringing an electrolyte into contact with the substance being treated.

3. The combination of a closed receptacle for containing a substance to be treated, an adjustable electrode adapted to automatically maintain contact with the substance being treated, means for clamping said electrode in any desired position and thereby rendering it non-automatic, a pipe connected with said receptacle for carrying off the by-products therefrom, and means for bringing an electrolyte into contact with said substance.

In testimony whereof I affix my signature in the presence of two witnesses.

GEO. D. BURTON.

Witnesses:
 J. H. JORDON,
 CHAS. E. BARBER.